M. C. IRONSIDE.
CAR COUPLING.
APPLICATION FILED JAN. 31, 1908.
921,707.
Patented May 18, 1909.
2 SHEETS—SHEET 1.
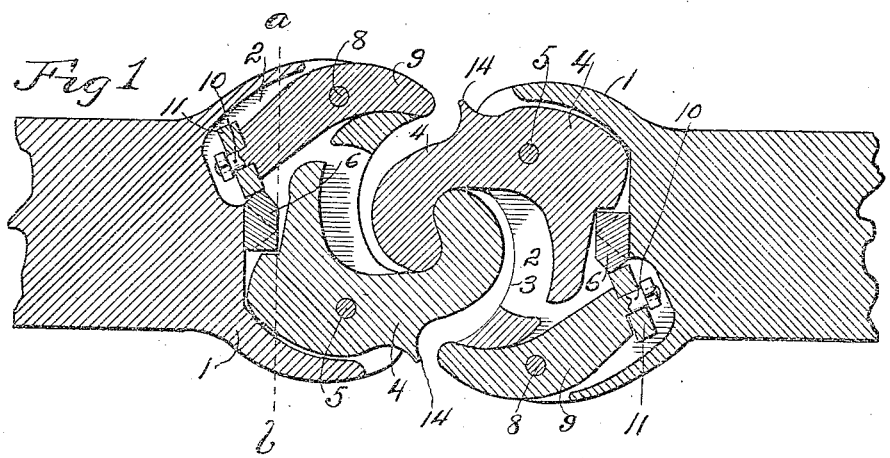
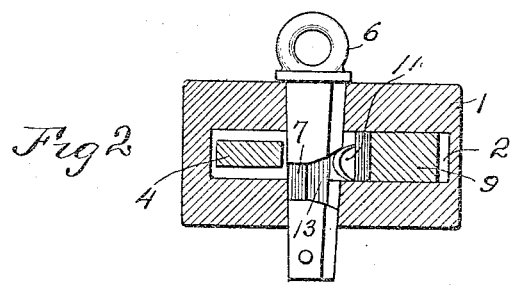
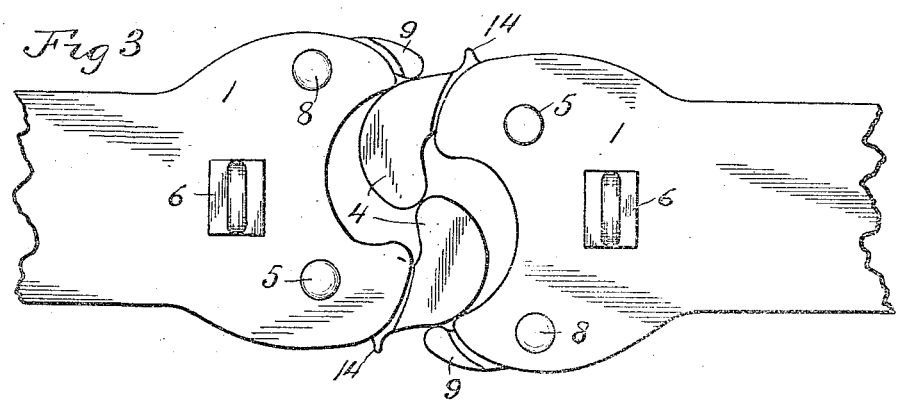
WITNESSES:
R. L. Hamilton
E. B. House
INVENTOR.
Matthew C. Ironside
BY Warren D. House
His ATTORNEY.

M. C. IRONSIDE.
CAR COUPLING.
APPLICATION FILED JAN. 31, 1908.
921,707.
Patented May 18, 1909.
2 SHEETS—SHEET 2.
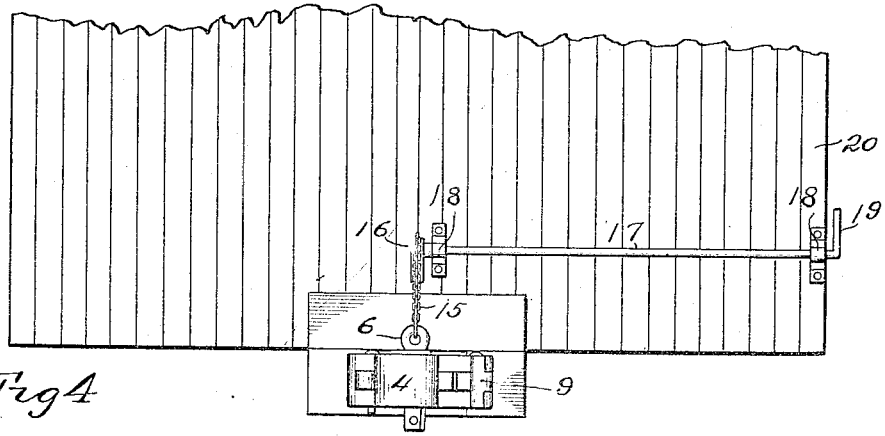
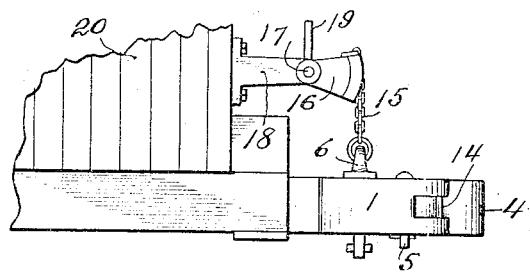
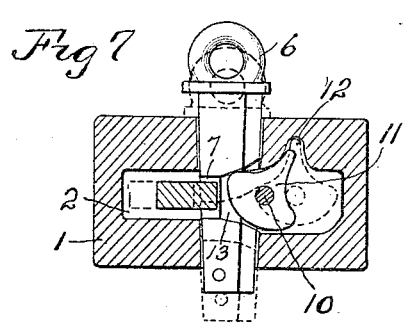
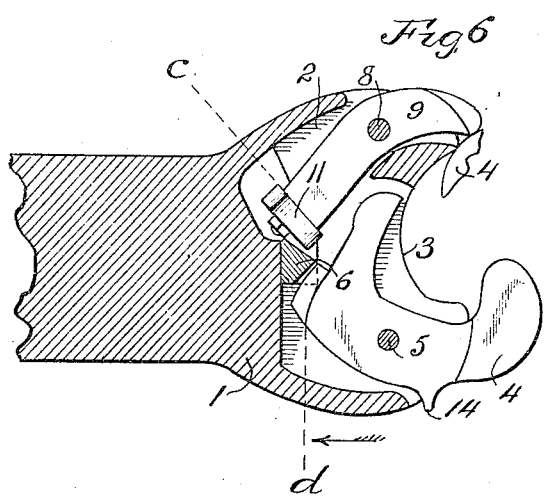
WITNESSES:
R. E. Hamilton
E. B. House
INVENTOR.
Matthew C. Ironside
BY Warren D. House
His ATTORNEY.

UNITED STATES PATENT OFFICE.

MATTHEW C. IRONSIDE, OF KANSAS CITY, KANSAS.

CAR-COUPLING.

No. 921,707.  Specification of Letters Patent.  Patented May 18, 1909.

Application filed January 31, 1908. Serial No. 413,585.

*To all whom it may concern:*

Be it known that I, MATTHEW C. IRONSIDE, a citizen of the United States, residing at Kansas City, in the county of Wyandotte and State of Kansas, have invented certain new and useful Improvements in Car-Couplers, of which the following is a specification.

My invention relates to improvements in car couplers.

It relates particularly to automatic couplers of the type embodying a pivoted coupler hook which is swung to and from the locked position by the engagement of an opposing coupler.

The object of my invention is to provide a construction which is strong, simple, durable and positive in action, and with which the coupling operation will be entirely automatic and with which the employment of springs or manual aid to effect the coupling operation will be dispensed with.

The novel features of my invention are hereinafter fully described and claimed.

In the accompanying drawings which illustrate my invention—Figure 1 is a horizontal sectional view of two couplers embodying my improved construction, in locked engagement with each other. Fig. 2 is a vertical section on the dotted line $a$—$b$ of Fig. 1. Fig. 3 is a top view showing two couplers in initial positions of engagement with each other. Fig. 4 is an end elevation of a portion of a car which is equipped with my improved coupler. Fig. 5 is a side elevation of my improved coupling device attached to a car, a portion of which is shown. Fig. 6 is a horizontal section of my improved coupler, the coupler hook being shown in the unlocked position, and one of the levers employed to raise the locking pin being engaged by an opposing coupler, a portion of which is shown. Fig. 7 is a sectional view taken on the broken dotted line $c$—$d$ of Fig. 6.

Similar characters of reference denote similar parts.

1 denotes the coupler head similar to the coupler head of well known "Janney" type, provided at its outer end with a recess 2, the outer, upper and lower recessed portion being concavely curved at 3 so as to force the coupler hook of the opposing coupler into the locked position.

4 denotes the coupler hook pivotally mounted in the recess 2 by means of a vertical knuckle pin 5, which extends through openings provided therefor in the upper and lower sides of the recessed portion of the coupler head 1. A locking pin 6 is vertically slidable in vertical holes provided therefor in the upper and lower sides of the recessed portion of the coupler head 1. This locking pin is disposed so as to be moved by gravity across the path of movement of the rear end of the coupler hook 4. When in the lower position shown in Figs. 1 and 2, the locking pin 6 engages the rear end of the coupling hook 4 and retains it in the locked position shown in Fig. 1. The locking pin 6 is provided with a notch or recess 7 which, when the locking pin is in the raised position shown in Fig. 7, is in register with the rear end of the coupling hook 4 and is of such a depth as to permit the passage therethrough of the rear end of the coupling hook when said hook is swung to the unlocked or open position shown in Fig. 6.

For the purpose of automatically raising the locking pin 6 to the position just described, the following described mechanism is employed:—Pivotally mounted in the recess 2 upon a vertical pin 8, secured at its upper and lower ends to the head 1, in holes provided therefor, is a horizontal lever 9, the outer end of which is disposed so as to be swung outwardly by the coupling hook 4 of the opposing coupler when a coupling is being made. Pivotally mounted upon the cylindrical inner end 10 of the lever 9, is a small sector shaped lever 11, which has its upper end loosely mounted in a recess 12, shown in Fig. 7, located on the inner side of the upper portion of the recessed part 2 of the coupler head 1. One end of the lever 11 is located in a recess 13 provided in the locking pin 6.

The coupling operation is effected in the following manner:—The coupler hook 4 of the opposing coupler first strikes the lever 9, thereby swinging the said lever which in turn will swing the lever 11 so as to raise the locking pin 6 to the position shown in Fig. 7, in which position the recess 7 will be opposite to the rear end of the coupler hook 4 adjacent thereto. The coupler hook 4 being free to move from the locked position, is swung by means of the coupler hook 4 of the opposing coupler to the open position shown in Fig. 6. As the couplers move closer together the coupler hooks 4 will be forced by the concave portions 3 of the coupler head into the locked positions shown in Fig. 1, in which positions the two coupler heads will interlock. The locking pins 6, which have been supported by the coupler hooks 4 in the elevated position shown in Fig. 7, will fall by gravity to the positions shown in Figs. 1 and 2, as soon as the coupler hooks have been fully retracted. Preferably the weight of the locking pin 6 is such that when it is unsupported by the coupler hook 4 the locking pin will, by its weight swing the lever 11 to the position shown in dotted lines in Fig. 7, thereby retracting the lever 9 to its original position shown in Fig. 1.

When it is desired to uncouple the couplers which are engaged with each other the locking pin 6 is raised by any desired means to the position shown in Fig. 7, at which time the hook 4 will be swung to the position shown in Fig. 6 after the cars have been separated from each other a suitable distance. For the purpose of effecting an automatic coupling it is immaterial with my improved coupler, whether the coupler hook is in the open position shown in Fig. 4 or in the locked or closed position shown in Fig. 1. If the coupler hook 4 is in the open position shown in Fig. 6, which is the position it will occupy after an uncoupling operation, unless it has been jarred or otherwise moved to the closed position, the coupling operation will be effected by the coupling hooks striking the curved portions 3 of the opposing couplers and being swung thereby to the closed position shown in Fig. 1, at which time the locking pins 6 being unsupported by the hooks 4 will fall into the locking position.

Upon the outer side of the coupling hook 4 and forward of the knuckle pin 5, is provided a projection 14 which serves to limit the opening movement of the hook 4. This projection 14 is disposed so as to strike the adjacent forward edge of the coupler head 1.

In Figs. 4 and 5 is shown a mechanism which may be employed to raise the locking pin 6 to the unlocked position. The chain 15 is secured at its lower end to the upper end of the locking pin 6 and at its upper end is secured to an arm 16 secured to a horizontal rock shaft 17, mounted in bearings 18, secured to the end of the car 20, the outer end of the rock shaft having a crank arm 19 by which the shaft is turned so as to raise the locking pin 6.

Various modifications of my invention may be made, within the scope of the appended claims, without departing from its spirit.

Having thus described my invention, what I claim and desire to secure by Letters Patent, is:—

1. In a car coupler, the combination with a coupler head, of a coupling hook movable thereon to and from the locked position by an opposite coupler, a locking pin for holding the hook in the locked position, and means actuated by an opposing coupler for moving said locking pin to a position in which the hook will be released therefrom.

2. In a car coupler, the combination with a coupler head, of a coupling hook movable thereon to and from the locked position by an opposing coupler, a locking pin movable by gravity to a position in which it will hold the coupling hook in the locked position when the coupling hook has been moved to such position, and means actuated by an opposing coupler for moving said locking pin to a position in which the coupling hook will be released therefrom.

3. In a car coupler, the combination with a coupler head, of a coupling hook movable thereon to and from the locked position by an opposing coupler, a locking pin movable by gravity to a position in which it will hold the coupling hook in the locked position when the coupling hook has been moved to such position, said coupling hook, when in the unlocked position, supporting said locking pin, and means actuated by an opposing coupler for moving said locking pin to a position in which the coupling hook will be released therefrom.

4. In a car coupler, the combination with a coupler head, of a coupling hook movable thereon to and from the locked position, a locking pin for holding the coupler hook in the locked position, a lever for moving said locking pin to a position in which the coupler hook will be released therefrom, and means actuated by an opposing coupler for swinging said lever so as to disengage the locking pin from the coupler hook.

5. In a car coupler, the combination with a coupler head, of a coupling hook movable thereon to and from the locked position, a vertically movable locking pin movable by gravity to a position in which it will engage and hold the coupling hook in the locked position, a lever for raising the locking pin to a position in which it will be disengaged from the coupling hook, and means actuated by an opposing coupler for swinging the lever so as to move the locking pin to the last named position.

6. In a car coupler, the combination with a coupler head, of a coupling hook movable thereon to and from the locked position, a locking pin for holding the coupler hook in the locked position, a lever pivoted to said coupler head and movable in one direction by an opposing coupler, and means by which, when said lever is swung in said direction, the locking pin will be disengaged thereby from the coupler hook.

7. In a car coupler, the combination with a coupler head, of a coupling hook movable thereon to and from the locked position, a vertically movable locking pin movable by gravity to a position in which it will engage and hold the coupling hook in the locked position when the coupling hook has been moved to such position, a lever pivoted to said coupler head and movable in one direction by an opposing coupler, and means by which, when said lever is moved in said direction, the locking pin will be raised to a position in which it will be disengaged from the coupling hook.

8. In a car coupler, the combination with a coupler head, of a coupling hook movable thereon to and from the locked position, a locking pin for holding the coupler hook in the locked position, a lever pivoted to the coupler head and movable in one direction by an opposing coupler, and a second lever for moving the locking pin to a position in which the locking pin will be disengaged from the coupler hook, said second lever being actuated by the first named lever when the first named lever has been swung by an opposing coupler.

9. In a car coupler, the combination with a coupler head, of a coupling hook movable thereon to and from the locked position, a locking pin movable to and from a position in which it will hold the coupler hook in the locked position when said hook has been moved to said position, a lever pivoted to the coupler head and movable in one direction by an opposing coupler, and a second lever pivotally mounted on the first named lever and engaging the coupler head and said locking pin, the locking pin being moved by said second lever out of engagement with the coupler hook when the first named lever is actuated by an opposing coupler.

10. In a car coupler, the combination with a coupler head, of a coupling hook pivoted thereto and movable from and to the locked position by an opposing coupler, a vertically movable locking pin movable across the path of movement of the coupling hook, for locking said hook in the locked position, the locking pin when moved out of the path of movement of the coupling hook and the coupling hook having been sufficiently moved toward the open position, being supported thereby, a lever movable in one direction by an opposing coupler, and means for raising the locking pin out of the path of movement of the coupling hook when said lever is swung in said direction, the locking pin moving by gravity across the path of movement of the coupling hook when the coupling hook has been moved to the locked position, said locking pin in its downward movement through the intermediacy of said locking pin raising means forcing said lever into position to be actuated by the opposing coupler.

In testimony whereof I have signed my name to this specification in presence of two subscribing witnesses.

MATTHEW C. IRONSIDE.

Witnesses:
E. B. HOUSE,
R. E. HAMILTON.